May 7, 1957     H. VIEWEG     2,791,705
ELECTRIC NON-CONDUCTORS FOR PRODUCING STATIC ELECTRICITY
Filed Jan. 14, 1953
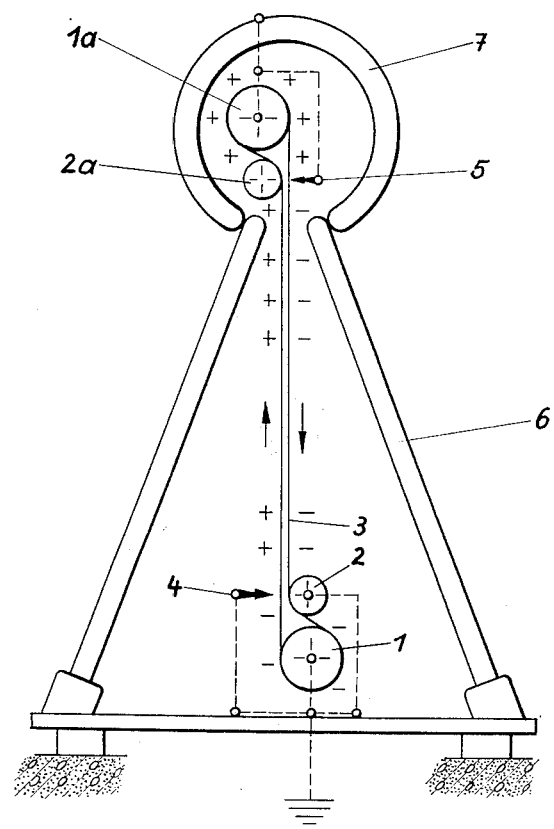
INVENTOR
Heinz Vieweg
BY Bailey, Stephens and Huettig
Attorneys

2,791,705
ELECTRIC NON-CONDUCTORS FOR PRODUCING STATIC ELECTRICITY

Heinz Vieweg, Munich, Germany, assignor to Metzeler Gummiwerke A. G., Munich, Germany Application January 14, 1953, Serial No. 331,329

Claims priority, application Germany January 24, 1952

7 Claims. (Cl. 310—5)

The present invention relates to improved compositions adapted to produce static electricity; and to objects manufactured therefrom.

It is a well known phenomenon that by friction, pressure, tension, torsion or separation after intimate contact of two different substances an electric charge can be produced, which is generally known as static electricity. This phenomenon can be made visible and utilized in the simplest manner, particularly on electric non-conductors.

However, the property of certain materials to generate static electricity may constitute an undesirable effect in many industrial processes. For instance, in the use or manufacture of textiles, synthetics, rubber, paper and similar articles, the creation of static electricity is very undesirable and of great disadvantage in most instances. Under such circumstances, the endeavor is to avoid the formation of static electricity to begin with, and if it is formed, to drain it off. This can be most effectively accomplished, for example, by ionizing the surrounding air or by lowering the external or internal resistance of the material in question.

On the other hand, the capability of nonconductors to generate static electricity in the above manner has been utilized in certain devices and machines. Thus, hard rubber, for instance, has been used for this purpose in frictional electric machines; also natural silk as well as rubber bands with and without textile cores have been used, particularly in Van de Graaff type electro-static generators. However, the output of such machines and devices is rather limited, because the capability of the carrier media used therein to generate and/or to absorb a static charge is relatively small.

I have now discovered that the capability of nonconductors made of rubber, synthetics and the like to generate static electricity can be materially increased, and thus devices and machines made with such materials are capable of generating larger amounts of static electricity, if the electric charge generator or the charge carrier are so chosen that their dielectric constant is high or at least higher than the dielectric constants of the non-conductors usually used for this purpose, while its internal resistance is not reduced as compared to ordinary non-conductors, but is preferably also high.

I have further discovered that such high-output non-conductors for generating static electricity made of rubber, synthetics or similar materials can be obtained by incorporating into such materials substances having ferroelectric properties which increase the dielectric constant of the material without reducing its internal resistance. The expression "substances having ferro-electric properties" as used herein is intended to mean substances whose properties show an analogy with magnetic iron. It was found, for instance, that titanates have not only a high dielectric constant, but that they also have an electric field-responsive dielectric constant, a dielectric hysteresis with a coercive force and a Curie point. The hysteresis observed on these substances is analogous with magnetic hysteresis. This property is described in greater detail in Ind. Eng. Chem. 42 (1950), 264 and in Physik I (1949), 10 and 473.

For this purpose, rutile, titanates, particularly the alkaline earth titanates such as barium titanate, strontium titanate and magnesium titanate or mixtures of such titanates, as well as ceramic compositions having a high dielectric constant and other similar materials are suitable. Other suitable substances are binary systems containing titanium oxide and an alkaline earth metal oxide, such as the $BaO$—$TiO_2$ system.

However, carbon black or the like is not suitable to accomplish the purpose in accordance with the invention, because although such substances are capable of increasing the dielectric constant, they reduce the internal resistance of the material admixed therewith to an excessive degree when they are added in amounts large enough to increase the dielectric constant to an appreciable extent.

Further objects and advantages of the invention will appear more fully from the following description, especially when taken in conjunction with the accompanying drawing which forms a part thereto.

In the drawing:

The single figure shows an electrostatic machine embodying the invention.

In this machine, rollers 1, 1a and 2, 2a act as guides for a belt 3 formed of a material according to the present invention. The parallel runs of the belt are held in spaced relation by the guiding rollers. The contact brushes or collectors are indicated at 4 and 5. Legs 6 support the upper portion of the machine, which is constructed as a Faraday screen 7.

The material according to the invention may be produced as shown in the following examples:

*Example 1.*—Synthetic threads having a high dielectric constant were obtained by adding 50 parts by weight of barium titanate to 100 parts by weight of molten polyurethane, and by spinning the resulting mixture, which was then worked into threads or fabrics.

Similar results were obtained by substituting other compounds which are capable of being spun into threads for the polyurethane, as for instance cellulose, particularly acetyl cellulose, benzyl cellulose and nitro cellulose, polyacrylic acid, polyacrylic nitrile, lactane of amino capronic acid and others.

*Example 2.*—100 parts by weight of polyisobutylene were mixed with 200 parts by weight of strontium titanate and 12 parts by weight of oil carbon black and 2% softener. The resulting mass was then worked into sheets, strips, plates, rings, ribbons and the like, which were found to have a high dielectric constant and a high internal resistance.

Similar results can be obtained by substituting polyvinyl chloride, polystyrol, polyethylene, or similar synthetic compounds for the polyisobutylene.

*Example 3.*—100 parts by weight of natural rubber were mixed with 100 parts by weight of barium titanate, 5 parts by weight of zinc oxide, 1.5 parts by weight of sulphur, 1.5 parts by weight of mercaptobenzothiazole disulfide and 0.5 part by weight of diphenylguanidine. The resulting mass was transformed into unvulcanized, as well as vulcanized articles of desired shape and size, which had a high dielectric constant and a high internal resistance.

Similar results were obtained when the natural rubber was substituted by synthetic rubber such as butadiene polymerisate or mixed polymerisates.

*Example 4.*—Natural and synthetic threads and fabrics obtained in accordance with the above examples were also saturated and coated with the respective compounds. In particular, a solution made of components of Example 3 was prepared by dissolving the natural rubber mixture in gasolene; the solution was then applied to a cotton fabric, and the solvent was allowed to evaporate. These steps were repeated several times until the surface became even and smooth and showed no more air spaces. The fabric was then vulcanized. Synthetic threads and fabrics were subjected to the same treatment. In each case the resulting product was one with a high dielectric constant and a high internal resistance.

A further improvement of compositions compounded in accordance with the invention may be obtained by orienting the individual particles of the composition. Such an orientation may be accomplished by subjecting the compositions to a mechanical stress either during or after their manufacture. For example, the above mentioned ribbons, strings, etc. may be stretched or racked during or after their manufacture; also, the above mentioned rubber plates may be subjected to tension in a semi-vulcanized condition, and the vulcanization process is then completed in the stretched condition. This procedure may be applied to the carrier material, to the threads, as well as to the coating.

The coating may consist of several layers having different properties. For example, fabrics may be coated with substances having a different dielectric constant. Furthermore, the coating may be superficially treated with the substances having ferro-electric properties either before or after the vulcanizing step, or both before and after the vulcanizing step.

Having now described my invention completely and fully, what I claim is:

1. In a frictional electric machine, a frictional element comprising a base of non-conductive plastic material and a substance having ferro-electric properties admixed therewith, thereby increasing the dielectric constant of said base, but maintaining the internal resistance thereof at substantially the same value as that of the non-conductive plastic material alone.

2. In a frictional electric machine, a frictional element in accordance with claim 1, wherein said substance having ferro-electric properties is at least one titanium compound selected from the group consisting of rutile and the titanates of barium, strontium, and magnesium.

3. In a frictional electric machine, a frictional element in accordance with claim 1, wherein said substance having ferro-electric properties is a mixture of at least two titanium compounds selected from the group consisting of rutile, and the titanates of barium, strontium and magnesium.

4. In a frictional electric machine, a frictional element in accordance with claim 1, wherein said substance having ferro-electric properties is the binary compound of barium oxide and titanium oxide.

5. In a frictional electric machine, a frictional element in accordance with claim 1, wherein said non-conductive plastic material is natural rubber.

6. In a frictional electric machine, a frictional element in accordance with claim 1, wherein said non-conductive plastic material is synthetic rubber.

7. In a frictional electric machine, a frictional element in accordance with claim 1, wherein said non-conductive plastic material is a synthetic resin.

References Cited in the file of this patent
UNITED STATES PATENTS

| | | |
|---|---|---|
| 2,106,039 | Safford | Jan. 18, 1938 |
| 2,501,868 | Hodgdon | Mar. 28, 1950 |
| 2,571,100 | Augustin | Oct. 16, 1951 |
| 2,697,793 | Trump et al. | Dec. 21, 1954 |